(12) United States Patent
McEwen et al.

(10) Patent No.: US 9,835,132 B2
(45) Date of Patent: Dec. 5, 2017

(54) WIND OR TIDAL TURBINE BLADE HAVING AN ATTACHMENT

(75) Inventors: Luke Neil McEwen, Lymington (GB); Frederic Herve Louarn, Urville-Nacqueville (FR); Julien Sellier, Isle of Wight (GB); Anthony James Chignell, Hythe Southampton (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 0 days.

(21) Appl. No.: 13/389,336

(22) PCT Filed: Aug. 6, 2010
(Under 37 CFR 1.47)

(86) PCT No.: PCT/EP2010/061523
§ 371 (c)(1),
(2), (4) Date: Sep. 13, 2012

(87) PCT Pub. No.: WO2011/015666
PCT Pub. Date: Feb. 10, 2011

(65) Prior Publication Data
US 2013/0108464 A1 May 2, 2013

(30) Foreign Application Priority Data
Aug. 7, 2009 (GB) .................... 0913935.3

(51) Int. Cl.
*F03D 1/06* (2006.01)
*F03D 3/06* (2006.01)
(Continued)

(52) U.S. Cl.
CPC ............ *F03D 1/0658* (2013.01); *F03B 3/121* (2013.01); *F03D 1/065* (2013.01); *F03D 1/0691* (2013.01);
(Continued)

(58) Field of Classification Search
CPC ...... F03D 1/065; F03D 1/0658; F03D 1/0691; F03D 3/064
(Continued)

(56) References Cited

U.S. PATENT DOCUMENTS 2,297,142 A * 9/1942 German .................. 403/332
3,713,753 A * 1/1973 Brunsch .................. 416/226
(Continued)

FOREIGN PATENT DOCUMENTS

| EP | 1950414 A | 7/2008 |
|----|-----------|--------|
| GB | 2009330 A | 6/1979 |

(Continued)

OTHER PUBLICATIONS

Nov. 16, 2011 Notice of Grant in corresponding GB Application No. GB 0913935.3.
(Continued)

*Primary Examiner* — Ninh H Nguyen
*Assistant Examiner* — Brian P Wolcott
(74) *Attorney, Agent, or Firm* — Polsinelli PC

(57) ABSTRACT

A wind or tidal turbine blade having an attachment, the attachment including: a support portion of the turbine blade, the support portion having opposite surfaces; an insert adapted to mount a bolt for attaching the support portion to another structure; and a mounting for fitting the insert to the support portion, the mounting including a layer extending over a front face of the insert and bonded to the opposite surfaces of the support portion on opposite sides of the insert, the layer permitting passage of a bolt therethrough to or from the insert.

19 Claims, 8 Drawing Sheets

(51) Int. Cl.
*F03B 3/12* (2006.01)
*F03D 80/00* (2016.01)

(52) U.S. Cl.
CPC .............. *F03D 3/064* (2013.01); *F03D 80/00* (2016.05); *F05B 2240/302* (2013.01); *F05B 2260/301* (2013.01); *Y02E 10/223* (2013.01); *Y02E 10/721* (2013.01)

(58) Field of Classification Search
USPC ........ 416/204 R, 205, 207, 208, 210 R, 211, 416/214 R, 213 A, 239, 153
See application file for complete search history.

(56) References Cited

U.S. PATENT DOCUMENTS

| | | | |
|---|---|---|---|
| 4,110,056 A | | 8/1978 | Stevenson |
| 4,788,088 A | * | 11/1988 | Kohl ........................... 428/34.5 |
| 4,915,590 A | * | 4/1990 | Eckland et al. ............. 416/225 |
| 5,482,584 A | | 1/1996 | Herrmann et al. |
| 6,305,905 B1 | | 10/2001 | Nagle et al. |
| 7,163,378 B2 | * | 1/2007 | Kildegaard ................... 416/230 |
| 2007/0154317 A1 | * | 7/2007 | Cairo ............................ 416/230 |
| 2008/0206059 A1 | * | 8/2008 | Hancock et al. ......... 416/213 R |
| 2009/0010764 A1 | | 1/2009 | Parisy et al. |
| 2012/0207607 A1 | * | 8/2012 | Mironov ................... 416/204 R |

FOREIGN PATENT DOCUMENTS

| | | |
|---|---|---|
| GB | 2372784 A | 11/2000 |
| WO | WO2008/119942 A1 | 10/2008 |

OTHER PUBLICATIONS

Dec. 14, 2011 International Search Report and Written Opinion in corresponding Application No. PCT/EP2010/061523.
Dec. 9, 2009 Combined Search and Examination Report in GB Application No. 0913935.3.
First Office Action dated Mar. 5, 2014 in counterpart Chinese Patent Application No. 201080041785.7 (with English translation).
Office Action dated Jan. 6, 2016 in corresponding Danish Patent Application No. PA 2012 00173.

* cited by examiner

WIND OR TIDAL TURBINE BLADE HAVING AN ATTACHMENT

FIELD OF THE INVENTION

The present invention relates to a wind or tidal turbine blade having an attachment, in particular a root attachment for attaching the root of the blade to a hub or an attachment for attaching together two portions of a wind or tidal turbine blade.

BACKGROUND

A wind turbine generator is typically made of these parts: a tower; a nacelle sitting at the top of the tower including generators, gearboxes or any means to convert wind energy to electrical energy; a hub with a pitch bearing for each blade; and a plurality, e.g. two or three, of wind turbine blades each fitted to a respective pitch bearing of the hub. A tidal generator correspondingly includes a hub and blades fitted thereto.

The "root" of the blade is the end attached to the hub via the pitch bearing and is typically cylindrically annular, and shaped and dimensioned to mate with the bearing. Blades are commonly built using composite materials, in particular fibre reinforced composite materials comprising fibres within a resin matrix, and so the composite material root must be attached to the pitch bearing which is composed of metal. The attachment is usually achieved by bolting the root to the bearing so that the blade may be mounted and dismounted.

It is necessary for the root attachment system to be able reliably, in use, to carry both tensile and compression forces which are alternately imposed thereon as the wind turbine blade rotates during operation of the wind turbine.

Typically the blade is joined to the pitch bearing by a circular array of bolts extending circumferentially around the annular root, for example about 50-100 bolts for a large blade, typically up to 55 m long. There are three common methods in use for attaching the bolts to the composite structure of the blade:

T-bolts: as shown in FIG. 1, for each bolt 300 extending from the pitch bearing (not shown), a cylindrical metal insert 302 is fitted into a radially extending hole 304 extending through the thickness of the annular blade root 306. The inserts 302 are typically 2-3 times the diameter of the bolt 300. The insert 302 is drilled and tapped with a helical thread to accept the helically threaded bolt 300, which is inserted through a longitudinally extending hole 308 in the free end 310 of the root 306. The root 306 must be thick to have sufficient bearing strength to prevent pull-out of the inserts 302. The thickness means the root 306 is heavy and is a problem for manufacture due to exotherm of the resin in the composite material. This system is currently used by most blade manufacturers using resin infusion to produce the fibre reinforced composite material root.

Bonded bushes: as shown in FIG. 2, for each bolt extending from the pitch bearing (not shown), a longitudinal hole 402, larger than the diameter of the bolt, is drilled in the free end of the composite material root 404. A cylindrical bush 406 is adhered into the hole 402. The bush 406 is internally threaded to accept the bolt. The bond strength of the bushes 406 to the composite root 404 is critical, requiring careful manufacture. The fibre reinforced composite material laminate needs to be thick to be strong enough even after the holes 402 are drilled, causing problems with exotherm of the resin as described above.

Bushes laminated-in: as shown in FIG. 3, for each bolt extending from the pitch bearing (not shown), a longitudinally extending bush 502 is disposed within the root 504, extending inwardly from the free end 506, the bushes 502 being included within the laminated composite material during the lamination process, rather than being adhered in afterwards as for the bonded bushes system described above. This allows the root laminate to be much thinner, as it naturally follows the shape of the bushes 502 without needing unnecessary composite material between them. Hence this solution is lighter and less prone to exotherm than (a) and (b). Foam 510 is provided between the adjacent laminate portions 512 annularly surrounding the bushes 502. However it is complicated to laminate, hence labour costs can be high.

SUMMARY OF THE INVENTION

The present invention aims to provide a wind or tidal turbine blade having an attachment, in particular a root attachment for attaching the root of the blade to a hub, which at least partially overcomes these problems of known root attachment systems.

Wind turbine blades are being manufactured in increasing length, for example up to about 60 m at the present time, which causes difficulty in transportation.

Furthermore, the present invention aims to provide a wind or tidal turbine blade having an attachment which is adapted for attaching together two portions of a wind or tidal turbine blade. A single blade can be composed of plural portions which can be connected together by the attachment.

The present invention also aims to provide an attachment system, such as a root attachment system for a wind or tidal turbine blade, which is able reliably, in use, to carry both tensile and compression forces which are alternately imposed thereon, for example as the wind or tidal turbine blade rotates during operation of the turbine.

Accordingly, the present invention provides a wind or tidal turbine blade having an attachment, the attachment comprising:

a support portion of the turbine blade, the support portion having opposite surfaces;

an insert adapted to mount a bolt for attaching the support portion to another structure; and a mounting for fitting the insert to the support portion, the mounting comprising a layer extending over a front face of the insert and bonded to the opposite surfaces of the support portion on opposite sides of the insert, the layer permitting passage of a bolt therethrough to or from the insert.

According to the present invention, an attachment system is provided, which may be a root attachment system for a wind or tidal turbine blade, which is able reliably, in use, to carry both tensile and compression forces which are alternately imposed thereon, for example as the wind or tidal turbine blade rotates during operation of the turbine.

Preferably, the mounting comprises a fibre reinforced composite material.

The insert may include a neck extending outwardly from the front face, the bolt extending from the neck.

The rear face of the insert may have a non-planar surface for mating with a complementary end surface of the support portion. Optionally, the rear face of the insert is concave and the end surface is convex. Optionally, the rear face of the insert and the end surface have complementary stepped surfaces.

Preferably, the support portion is annular and the attachment provides at least one insert and at least one mounting forming an annular assembly for attaching the annular support portion to the another structure by a plurality of bolts, each bolt extending from the at least one insert.

In one embodiment the at least one insert comprises a plurality of inserts, each having a respective bolt, the inserts being arranged annularly around the support portion. Typically, adjacent side surfaces of the adjacent inserts abut. The adjacent side surfaces of the adjacent inserts may have interlocking elements so that adjacent inserts are locked together.

In another embodiment the at least one insert comprises a single annular insert.

Preferably, the at least one mounting comprises a single annular mounting.

Preferably, the mounting has a central portion covering the insert and opposed legs bonded to the opposite surfaces of the support portion on opposite sides of the insert.

Optionally, the mounting has a U-shaped section. Preferably, the opposed legs each have an end part of tapered cross-section, the leg thickness decreasing towards a free end of the respective leg. More preferably, the tapered end parts of the opposed legs each mate with a corresponding end region, having a tapered cross-section, of a respective outer layer of the support portion.

The mounting may be preformed. Optionally, the legs of the mounting flare outwardly apart and the opposite surfaces of the support portion are complementarily flared.

Optionally, the support portion decreases in cross-sectional thickness in a direction extending away from the insert. The support portion may include a wedge shaped tapered core extending inwardly from the insert and sandwiched between opposite outer layers of fibre reinforced composite material.

The support portion may comprise a central spar having opposite surfaces and a pair of opposed tapering bearing plates, each disposed adjacent to a respective opposite surface of the spar, the bearing plates decreasing in cross-sectional thickness in a direction extending away from the insert.

The opposed legs of the mounting may have ends which are bonded together, a cavity within the mounting comprising the insert and a core member, the core member comprising the support portion, and at least one outer face of at least one of the legs being bonded to a tapering portion of a root of the wind or tidal turbine blade.

Optionally, the mounting comprises two mounting portions, a first mounting portion having a first curved part covering the insert and a first adjacent part bonded to one of the opposite surfaces of the support portion, and a second mounting portion having a second curved part bonded to the first curved part and a second adjacent part bonded to the other of the opposite surfaces of the support portion.

The rear face of the insert may abut an end face of the support portion. Alternatively, the rear face of the insert is spaced from an end face of the support portion.

The turbine blade may further comprise an attachment structure to which the wind or tidal turbine blade is to be attached, the attachment structure comprising a block having a concave recess for receiving, in a mating relationship, a complementary convex portion of the mounting extending over the insert.

The block may comprise a pitch bearing of a hub of a wind or tidal turbine, or the block may be adapted to be affixed to a pitch bearing of a hub of a wind or tidal turbine.

Preferably, the support portion is a root of a wind or tidal turbine blade. Alternatively, the support portion is an end portion of a segment of a wind or tidal turbine blade.

The turbine blade may further comprise a collar mounted to at least one bolt to provide two opposed counter-threaded bolt ends extending away from the collar, each bolt being adapted to be received in a respective bore.

Preferably, opposed bearing faces of the collar are each adapted to engage a respective bearing surface of an insert.

The insert may include a bore for receiving a respective bolt, and the bolt may be threadably received in the bore, or captured in the insert. Alternatively, the bolt may be integral with the insert.

Preferably, the mounting includes a hole for passage therethrough of a respective bolt extending from the insert.

Preferably, the support portion comprises a fibre reinforced composite material, optionally including a central core.

The present invention further provides an attachment for attaching an element, such as a wind or tidal turbine blade, to another structure, the attachment comprising: an insert adapted to mount a bolt for attaching the attachment to another structure; and a mounting comprising a layer extending over a front face of the insert and, the layer permitting passage of a bolt therethrough to or from the insert, wherein the mounting has a central portion covering the insert and opposed legs, the opposed legs of the mounting have ends which are bonded together, and a cavity within the mounting comprises the insert.

In particularly preferred embodiments of the invention, the attachment is adapted to attach a wind or tidal turbine blade to another structure, such as a pitch bearing or a hub. However, in alternative embodiments, the attachment is adapted to attach another element, such as a different power generating element, for example a reciprocating element or blade of a tidal power device, to another structure. The attachment may, in yet further embodiments, be used to interconnect different components of a combined structure, for example segments of a bridge.

Optionally, the attachment is tapered and of decreasing cross-sectional thickness extending away from the insert to define an acutely inclined outer surface for bonding to a tapering portion of a root of the wind or tidal turbine blade.

The attachment may further comprise a core member having opposite surfaces extending away from a free end, the insert having a rear face facing towards the free end, and the legs of the mounting member being bonded to the opposite surfaces of the core member on opposite sides of the insert.

Optionally, the mounting comprises two mounting portions, a first mounting portion having a first curved part covering the insert and a first leg, and a second mounting portion having a second curved part bonded to the first curved part and a second leg.

Preferably, the mounting comprises a fibre reinforced composite material.

Preferably, the opposed legs each have an end part of tapered cross-section, the leg thickness decreasing towards a free end of the respective leg.

In one aspect the present invention relates to a system for connecting the root of a wind or tidal turbine blade to bolts extending from the pitch bearing of the hub. In another aspect the present invention relates to a system to provide any bolted connection between highly loaded parts of wind or tidal blades built using composite materials (incorporating fibres such as glass or carbon fibre embedded within any matrix material, such as a thermosetting resin).

The preferred embodiments of the present invention can provide an alternative way of incorporating a threaded metal insert into the blade root that is lighter than the known T-bolts system or bonded studs system but easier to laminate than the laminated-in studs system, each as described above.

BRIEF DESCRIPTION OF THE DRAWINGS

Embodiments of the present invention will now be described, by way of example only, with reference to the accompanying drawings, in which: —

DETAILED DESCRIPTION

Although the illustrated embodiments relate to wind turbine blades, it will be apparent to a skilled person how to adapt the present invention to manufacture tidal turbine blade embodiments.

Figure 1:
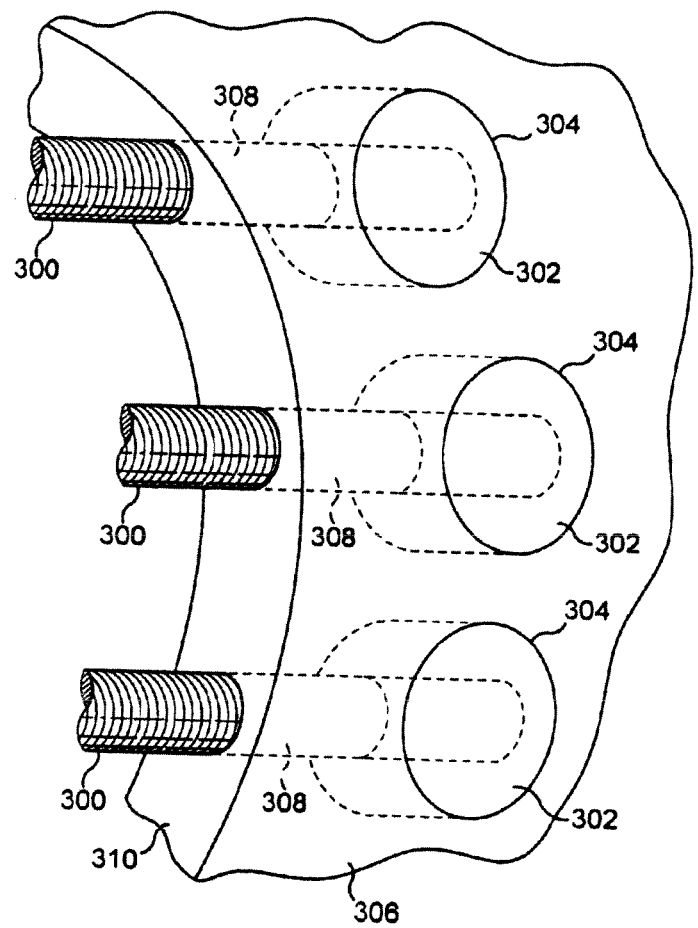
FIGS. 1 to 3 show respective different known wind turbine blade root attachments.
Figure 2:
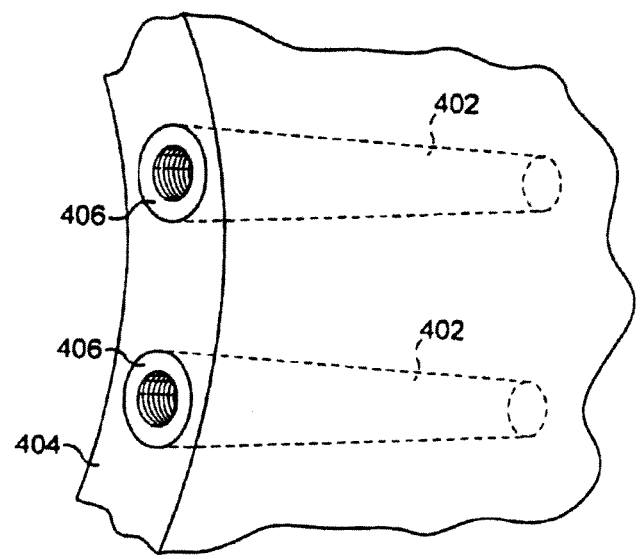
Figure 3:
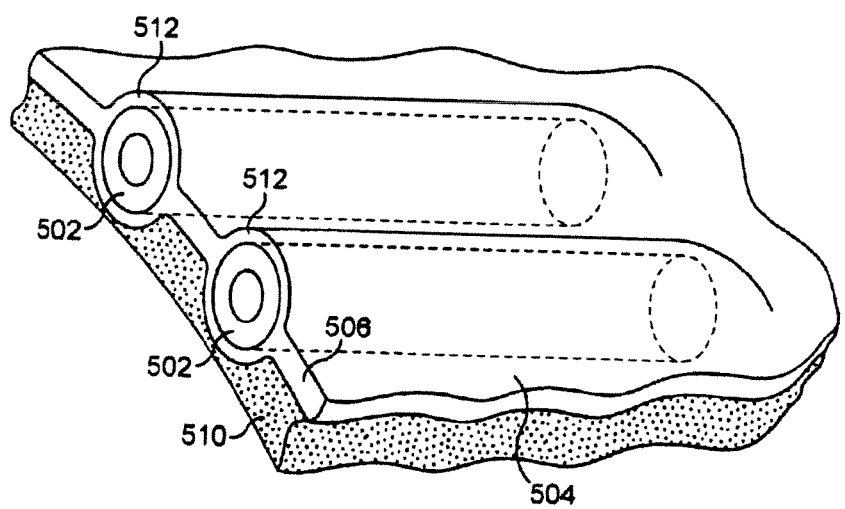
Figure 4:
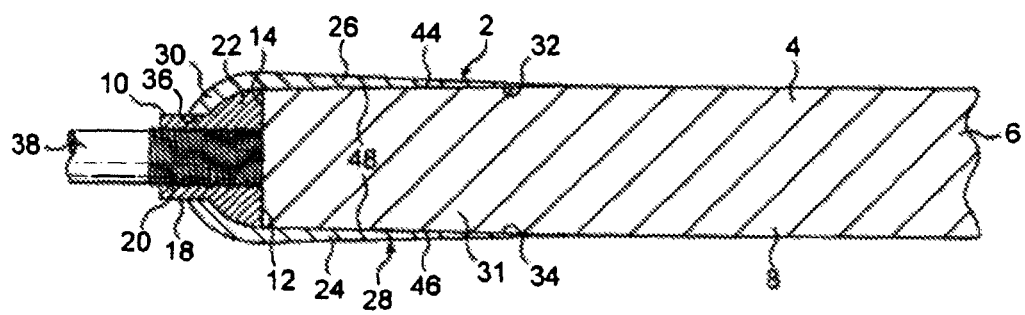
FIG. 4 is a schematic cross-section through a wind turbine blade root attachment in accordance with a first embodiment of the present invention.
Figure 5:
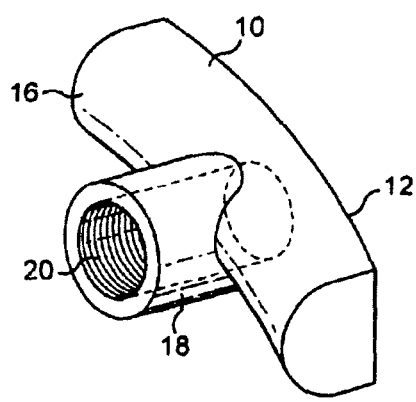
FIG. 5 is a schematic perspective view of the insert of the wind turbine blade root attachment of FIG. 4.
Figure 6:
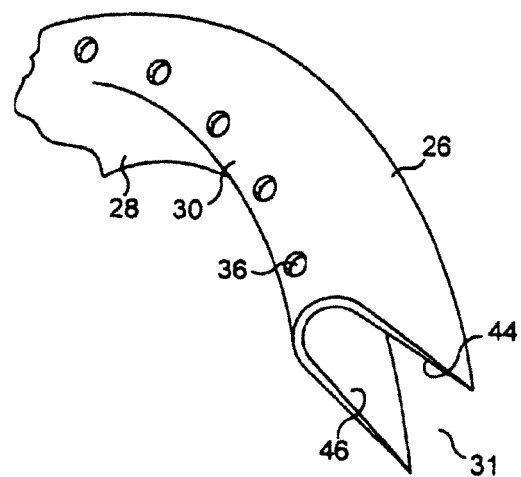
FIG. 6 is a schematic perspective view of a strap moulding of the wind turbine root attachment of FIG. 4.

Referring to FIGS. 4 to 6, there is shown a wind turbine blade root attachment 2 in accordance with a first embodiment of the present invention. The root 4 of the wind turbine blade 6 is composed of a laminate 8 of a fibre reinforced composite material, optionally with a core material therein, forming an annular, most typically cylindrically annular, root structure for attachment to the hub (not shown) by the root attachment 2. The root attachment 2 comprises at least one bolt support comprising an insert 10, shown in greater detail in FIG. 5, which has a rearwardly directed face 12 mating with an end face 14 of the annular root 4. In the illustrated embodiment the rearwardly directed face 12 is planar and the end face 14 is correspondingly planar.

No holes are drilled in the end face 14. Finishing the blade with a flat surface composed of the end face 14 is a relatively simple machining operation compared to drilling up to 100 holes accurately therein, as in some known systems as described above. The blade root may comprise the end of the blade shell, the end of the spar, a separately-moulded root insert or a combination of these three elements. As is known in the art, the inner and outer surfaces of the cylindrical root should be accurately cylindrical and concentric, i.e. the thickness of the root must be carefully controlled. This may be achieved by making both of the inner and outer surfaces moulded surfaces or by machining after de-moulding.

In this embodiment, the insert 10 has a convexly curved front face 16 which is typically substantially semicircular. Extending from the front face 16 is a neck 18 having a threaded bore 20 therein, the axis of the bore 20 being parallel to the axis of the root 4. The neck 18 extends away from the front face 16 of the insert 10 thereby to provide a bore length which is greater than the thickness of the main body 22 of the insert 10. The bore 20 may be formed as a blind hole, as illustrated, or alternatively may extend through the entire thickness of the main body 22 as well as the length of the neck 18.

The insert 10 is typically composed of a durable metal, such as steel or bronze. The end face of the neck 18 additionally provides that the root attachment can butt up securely against the pitch bearing of the hub to provide a secure fitting, capable of taking high compressive and tensile loads, between the pitch bearing and the blade root 4. It also means that the distance between the face of the blade root laminate and the pitch bearing is accurately controlled without relying on control of laminate thickness.

A substantially U-section strap moulding 24, shown in greater detail in FIG. 6, secures the insert 10 to the root 4. The strap moulding 24 comprises a moulding of fibre-reinforced composite material. The strap moulding 24 has opposed legs 26, 28 extending away from a central curved portion 30, defining a central channel 31 which is shaped and dimensioned to fit against the insert 10 and the root 4. The central curved portion 30 is fitted (and optionally bonded) over the front face 16 of the insert 10, and the opposed legs 26, 28 are fitted and bonded to respective outer and inner circumferential surfaces 32, 34 of the root 4. The strap moulding 24 is provided with a hole 36 in the central portion 30 through which the neck 18 extends. Accordingly, a root stud (or root bolt) 38 extending from the hub (not shown) may be threadably secured in the threaded bore 20 of the neck 18 by passage through the hole 36 of the strap moulding 34.

The strap moulding 24 is substantially annular so as to surround the annular root 4. The strap moulding 24 includes a plurality of holes 36 each of which fits over a respective neck 18. A plurality of the inserts 18 is fitted in an annular assembly around the circumference of the root 4 to provide an attachment for an annular array of root studs or bolts 38 between the hub (not shown) and the root 4.

During manufacture, the one or more threaded inserts 10 are disposed against the end face 14 of the blade in a location to align the bore 20 with a respective bolt 38. The inserts 10 are held in place temporarily using a jig. Then the U-section composite channel moulding 24 is fitted over the inserts 10, the necks 18 extending through the holes 36, and bonded onto the blade root 4. The moulding 24 may be laminated and cured on a separate mould.

The inwardly facing surfaces 44, 46 of the legs 26, 28 of the strap moulding 24 are bonded to the respective outer and inner circumferential surfaces 32, 34 of the root 4 either by an additional adhesive layer 48 or by bonding thereto by the resin matrix of the fibre reinforced composite material of the strap moulding 24. The strap moulding 24 comprises a laminate of a fibre reinforced composite material which may be moulded off-line and then fitted over the blade root 4 or alternatively laminated in situ over the assembly of the insert(s) 10 on the blade root 4. Typically, the strap moulding 24 comprises a laminate material which is a mixture of triaxially oriented and unidirectional fibre-reinforced composite materials or a mixture of biaxially oriented and unidirectional fibre-reinforced composite materials.

The insert 10 may have, as illustrated in FIG. 5, only a single neck 18 for fitting a single root stud or bolt 38 into a respective threaded bore 20. Alternatively the insert 10 may be at least partly arcuate and have a plurality of mutually spaced necks 18 each having a respective threaded bore 20 for fitting a plurality of root studs or bolts 38.

In one modified embodiment, a single annular insert 10 is provided together with a single annular strap moulding 24, the single annular insert 10 being provided with a plurality of threaded bores 20 for receiving a corresponding plurality of root studs or bolts 38 for attachment to the hub.

Figure 7:
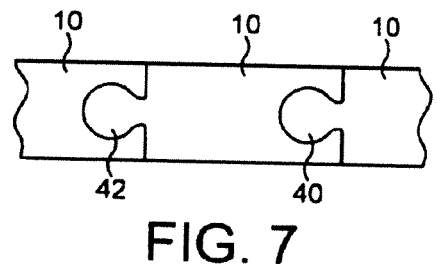
FIG. 7 shows schematically a modification of the edges of the insert of FIG. 5.

When a plurality of inserts 10 is provided, the inserts 10 may be disposed annularly around the root 4 in a mutually spaced configuration. Alternatively, the inserts 10 may be butted together, and when butted together, as shown in FIG. 7, optionally adjacent inserts 10 may be provided with complementarily shaped interlocking surfaces, for example a male dog bone 40/corresponding female cavity 42 structure. The provision of a plurality of inserts 10 is more easy to manufacture than a single annular insert 10.

In the embodiment of FIGS. 4 to 6 the rearwardly directed face 12 of the insert is planar. However, the rearwardly directed face may have a profiled surface adapted complementarily to fit with an end face of the blade laminate.

Figure 8:
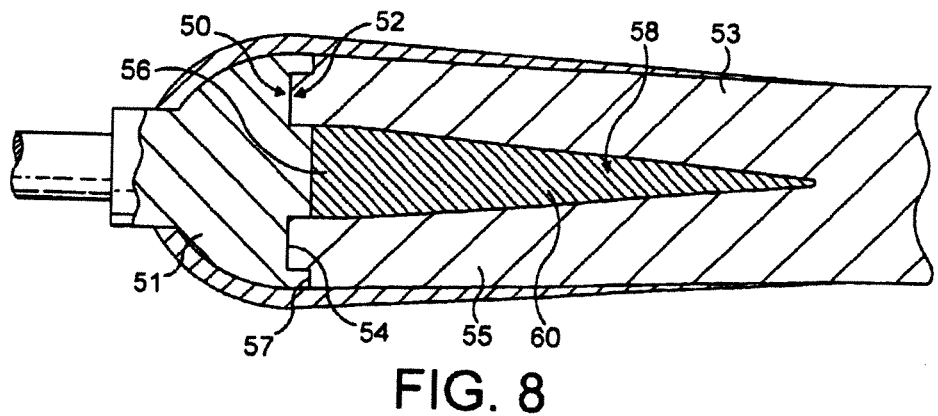
FIG. 8 shows a schematic cross-section through a wind turbine blade root attachment in accordance with a second embodiment of the present invention.

For example, as shown in FIG. 8 the rearwardly directed face 50 of the insert 51 and the end face 52 of the root 53 may have a stepped configuration 54. This provides an interlocking relationship between the insert 62 and the root 58 which enhances the mechanical strength of the connection therebetween. The centre portion 56 of the root 58 may be provided with a wedge-shaped core 60, for example of cellular foam, which tapers in cross section away from the end face 52. The core 60 can locally thicken the end 55 of the root 53 to provide an enlarged end surface 57 for mounting the insert 51 without adding significant extra weight.

Figure 9:
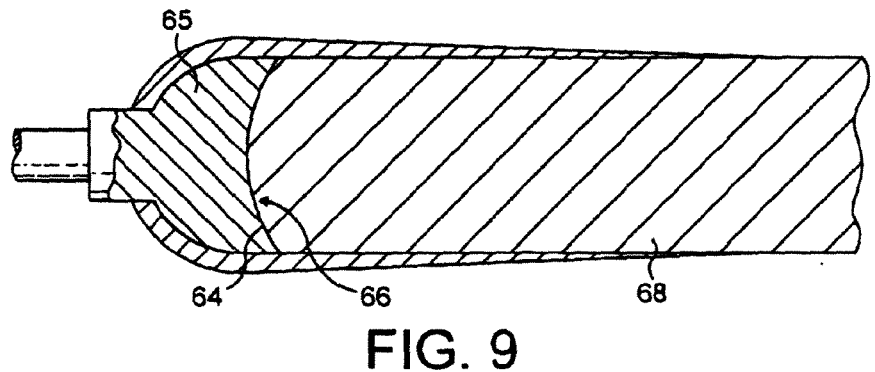
FIG. 9 shows a schematic cross-section through a wind turbine blade root attachment in accordance with a third embodiment of the present invention.

In another modification shown in FIG. 9, the rearwardly directed face 64 of the insert 65 may be concave and the end face 66 of the root 68 may be correspondingly convex to form a mating relationship therebetween. The concave face 64 may, in use, apply compression forces in the through-thickness direction of the root 68 to inhibit or prevent delamination of fibre reinforced composite layers within the root 68.

Figure 10:
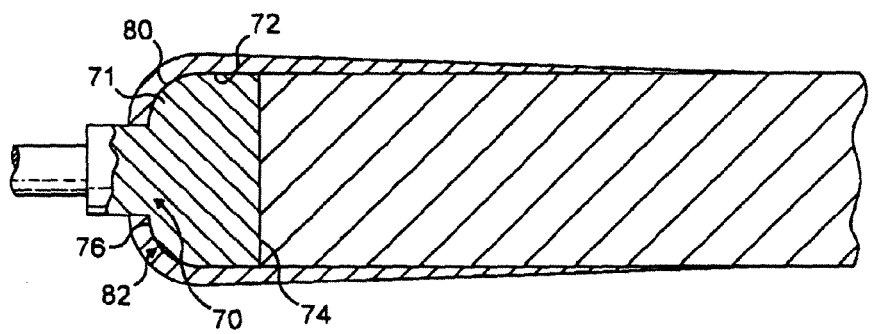
FIG. 10 shows a schematic cross-section through a wind turbine blade root attachment in accordance with a fourth embodiment of the present invention.

In the embodiment of FIG. 10, the front face 70 of the insert 71 comprises inner and outer cylindrical annular side faces 72, 74 connected to a planar central face 76, from which the neck 78 extends, by respective curved surfaces 80, 82.

Figure 11:
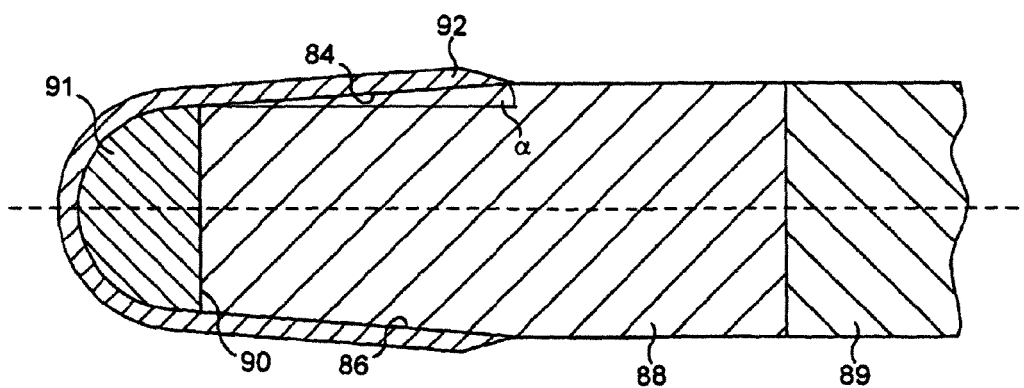
FIG. 11 shows a schematic cross-section through a wind turbine blade root attachment in accordance with a fifth embodiment of the present invention.

Referring to FIG. 11, in another embodiment the outer and/or inner circumferential surface 84, 86 of the root 88 of the blade 89 may be provided with a taper of decreasing root thickness in a direction towards the end face 90, the taper angle $\alpha$ typically being an angle of about 2 to 3 degrees. This can assist fitting the pre-formed U-section moulding 92 over the insert 91 and the root 88, which has a correspondingly shaped outwardly flaring configuration, by progressively sliding the moulding 92 over the outwardly tapering root surfaces 84, 86.

Figure 12:
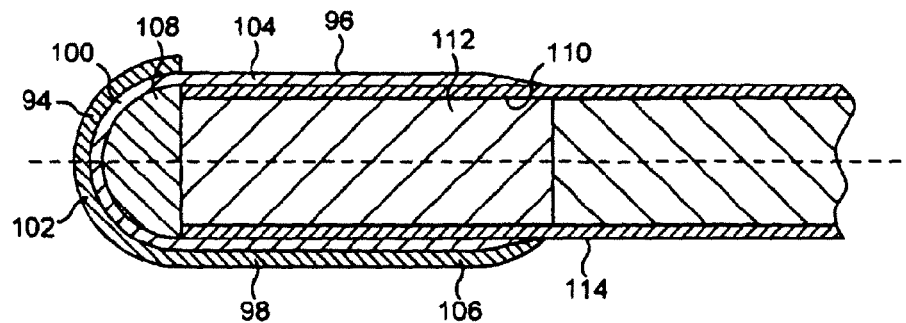
FIG. 12 shows a schematic cross-section through a wind turbine blade root attachment in accordance with a sixth embodiment of the present invention.

Referring to FIG. 12, in another embodiment the U-section moulding 94 comprises a pair of interlocking J-section mouldings 96, 98. Each J-section moulding 96, 98 comprises a curved end 100, 102 and a leg 104, 106. A first J-section moulding 96 is fitted over the insert 108 and the outer circumferential surface 110 of the root 112, and bonded thereto as described above, and then a second J-section moulding 98 is fitted over the curved end 100 of the first J-section moulding 96 and the inner circumferential surface 114 of the root 112. This embodiment provides a multiple-component U-section strap moulding which may be easier to manufacture and fit than a single-component U-section moulding.

Figure 13:
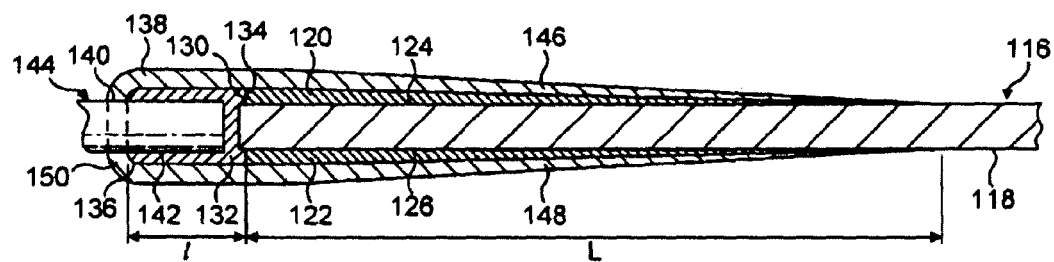
FIG. 13 shows a schematic cross-section through a wind turbine blade root attachment in accordance with a seventh embodiment of the present invention.

Referring to FIG. 13, in yet another embodiment the root 116 comprises a spar 118 composed of fibre reinforced composite material, of constant cross-section fitted with a pair of tapering bearing plates 120, 122, composed of fibre reinforced composite material, on the respective outer and inner circumferential surfaces 124, 126 of the root 118, and bonded thereto by adhesive or by the rein matrix of the fibre reinforced composite material. Optionally, the bearing plates may be integral with the U-section moulding 138. The end face 130 of the root 116 comprises the end faces of the spar 118 and of the bearing plates 120, 122, and may have a stepped configuration by the spar 118 extending outwardly further than the bearing plates 120, 122. The inserts 132 are fitted to the end face 130, and have a rearwardly directed face 134 with a stepped configuration shaped to interlock with the end face 130. A front face 136 of the inserts 132 is covered by the U-section moulding 138, with holes 140 in the U-section moulding 138 aligning with respective threaded bores 142 in the inserts 132 for receiving a respective bolt or stud 144.

The legs 146, 148 of the in the U-section moulding 138 have progressively reducing tapering thickness in a direction away from the central curved portion 150 covering the inserts 132. Such tapering of the leg thickness, along all or an end part of the leg, may be provided in any or all of the other embodiments.

In this embodiment, the dimensions may be as follows: the length l of the insert may be about 100 mm and the length L of the spar 118 covered by the U-section moulding 138 may be about 630 mm. This provides a compact bolt mounting structure as compared to known systems described above.

FIGS. 14 to 17 illustrated embodiments of the root attachment system in which the root attachment and the pitch bearing are configured to mate with complementary convex/concave surfaces so as to provide that the U-section spar moulding can, in use, carry both tensile and compression forces imposed thereon as the wind turbine blade rotates during operation of the wind turbine.

Figure 14:
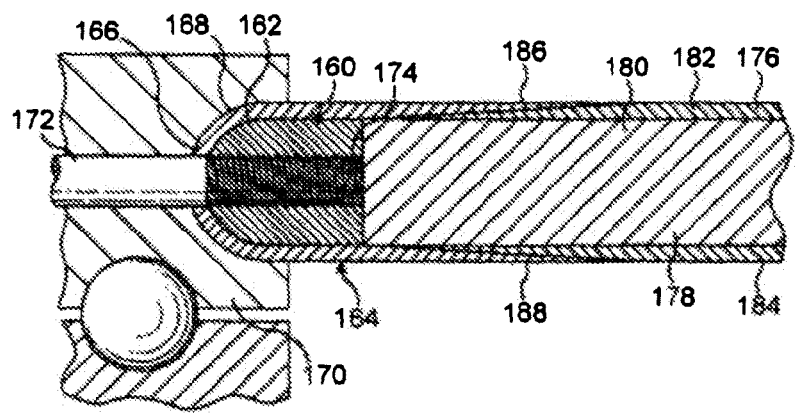
FIG. 14 shows a schematic cross-section through a wind turbine blade root attachment in accordance with an eighth embodiment of the present invention, the attachment being fitted to a hub.

Referring first to FIG. 14, as in the embodiment of FIG. 11, the insert 160 is not provided with a neck but has a smoothly convexly-curved front surface 162 which is wholly covered by the U-section spar moulding 164. The central curved section 166 of the moulding 164 therefore is smoothly convexly curved and provides a smoothly convexly curved projection 167 at the end of the root which is snugly fitted within a complementarily shaped annular concave groove 168 in the pitch bearing 170. This groove 168 forms a recess in the pitch bearing 170 for snugly receiving the annular free end of the root in a load bearing relationship. The groove 168 may be machined in the pitch bearing 170.

A stud or bolt 172 is threadably fitted into the threaded bore 174 of the insert 160 to securely bolt the wind turbine blade 176 onto the pitch bearing 170.

In this embodiment, additionally the root structure is modified. The root 178 comprises a central core 180, for example of cellular foam or laminated fibre reinforced composite material, sandwiched between two outer layers 182, 184 of fibre reinforced composite material. The free ends of the layers 182, 184 are tapered and mate with correspondingly tapered ends 186, 188 of the moulding 164. This provides, by the combination of the layers 182, 184 and the moulding 164, a substantially constant thickness outermost layer of composite material for the root 178 which encloses the insert 160 and the core 180, the insert 160 and the core 180 having substantially the same thickness in the radial direction. This structure provides a thinner laminate at the root 178 which provides a more lightweight structure.

The stress concentration at the end of blade laminate is reduced because the blade laminate can be thinner at that location since the blade laminate does not need to transmit a load in abutment into the flat end face 182 of the insert 160. The U-section moulding 164 is able to carry a compressive load because its end is supported externally by the snugly fitting pitch bearing 170 and internally by the insert 160. This prevents the U-section moulding 164 from bending or buckling around the curved end thereof. The provision of a recess 168 in the pitch bearing 170 also saves weight in the pitch bearing 170.

Figure 15:
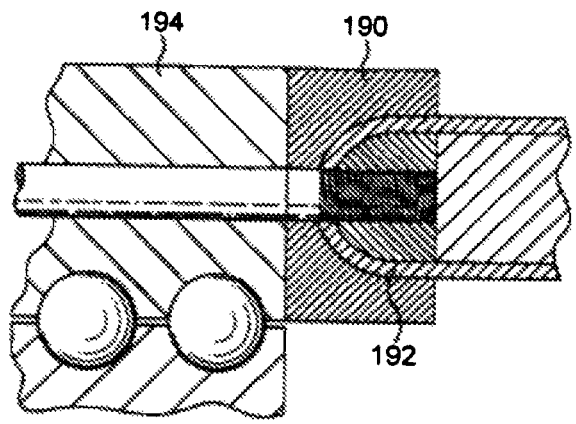
FIG. 15 shows a schematic cross-section through a wind turbine blade root attachment in accordance with a ninth embodiment of the present invention, the attachment being fitted to a hub.

A modified embodiment is illustrated in FIG. 15, in which, instead of the recess being provided in the pitch bearing itself, an additional mounting component 190 incorporating a grooved recess 192 is fitted to the pitch bearing 194.

Figure 16:
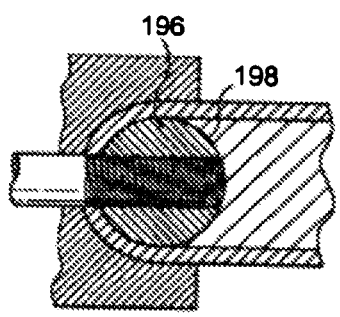
FIG. 16 shows a schematic cross-section through a wind turbine blade root attachment in accordance with a tenth embodiment of the present invention, the attachment being fitted to a hub.

In a further modified embodiment shown in FIG. 16, the insert 196 is provided with a cylindrical cross-section, and thereby has a curved end face 198 rather than a substantially planar end face as in the embodiments of FIGS. 14 and 15.

Figure 17:
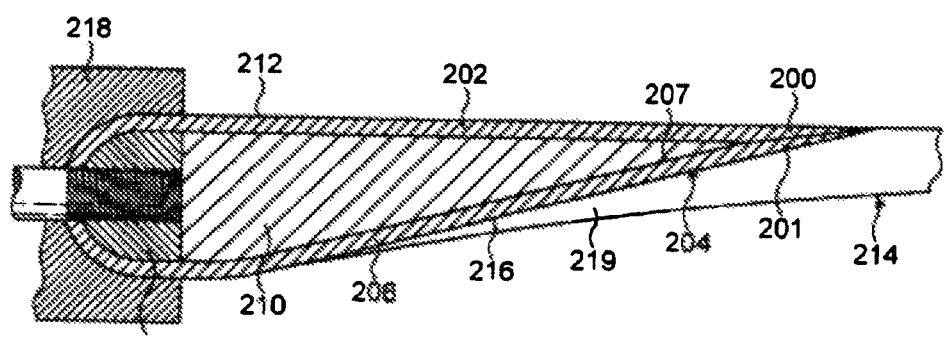
FIG. 17 shows a schematic cross-section through a wind turbine blade root attachment in accordance with an eleventh embodiment of the present invention, the attachment being fitted to a hub.

In a further modified embodiment illustrated in FIG. 17, the free ends 200, 201 of the legs 202, 204 of the U-section moulding 206 are not separated but are brought together and bonded together thereby to enclose the insert 208 and a tapered core 210. The moulding 206 so-formed is asymmetrical in structure, having one outer face 212 substantially aligned with the longitudinal direction of the axis of the blade 214 and an opposite outer face 216 being acutely inclined thereto to provide a tapering structure 207 for the end of the moulding 206 remote from the pitch bearing 218 which is fitted to a complementarily tapering mating end 219 of the blade or spar. However, in other embodiments a symmetrical structure may be provided, with both outer faces acutely inclined to the longitudinal direction of the axis of the blade and fitted to a complementarily tapering mating portion of the end of the blade or spar. Again, this provides a structure which can provide a root structure of reduced thickness and accordingly a blade of lighter weight.

This embodiment of the present invention may be further modified by the omission of the core—the two legs of the mounting are bonded together at their free ends to enclose a cavity containing the insert(s).

The primary application of the attachment of the present invention is for wind or tidal turbine blade root attachments. However, some wind turbine blades are made in shorter pieces for easier handling and transport, and then assembled on site before or during erection of the turbine. In this case a further application of the invention is to join the segments of a wind, or tidal, turbine blade together.

Figure 18:
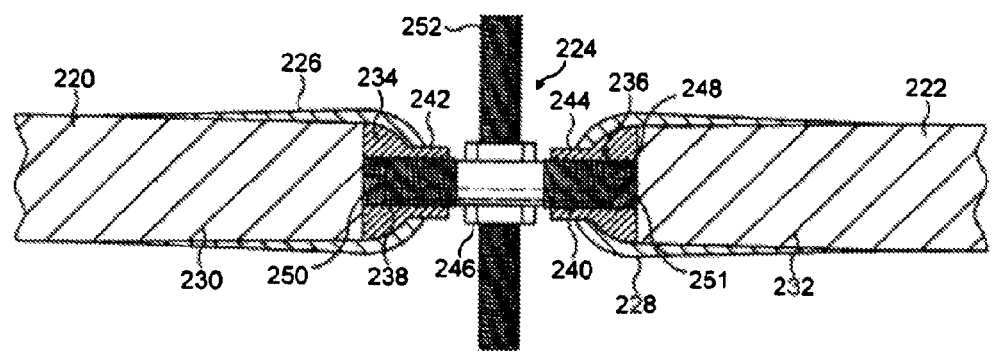
FIG. 18 shows a schematic cross-section through an attachment for joining together two portions of a wind turbine blade in accordance with a twelfth embodiment of the present invention.
Figure 19:
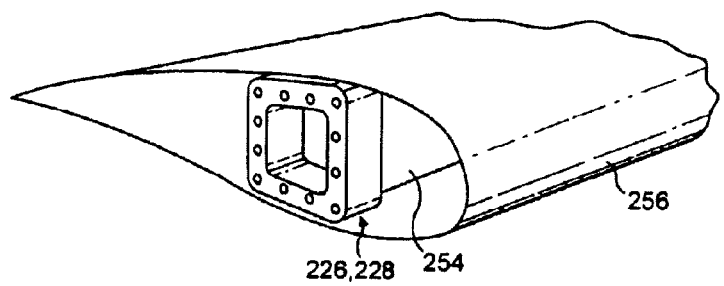
FIG. 19 shows schematically a perspective view of a fitting in a portion of the wind turbine blade in the embodiment of FIG. 18.
Figure 20:
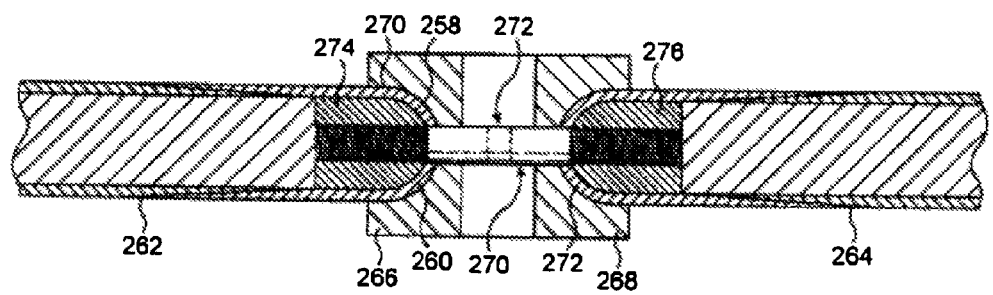
FIG. 20 shows a schematic cross-section through an attachment for joining together two portions of a wind turbine blade in accordance with a thirteenth embodiment of the present invention.

Accordingly, FIGS. 18 to 20 show embodiments for attaching together segments of a wind turbine blade, rather than attaching a root of a wind turbine blade to a pitch bearing.

Referring to FIG. 18, each of two wind turbine segments 220,222 to be joined together with an attachment 224 is provided, as the embodiment of FIG. 4, with an annular U-section moulding 226,228 bonded to an end 230,232 of a spar or laminate. The moulding 226,228 secures a respective insert 234,236, in particular a respective plurality of inserts arranged in an annular fashion, to the end of the spar or laminate of the respective wind turbine segment 220,222. The inserts 234,236 provide an annular array of threaded bores 238,240 extending through a neck 242,244 of the respective insert 234,236 and into a main body of the insert 234,236. The necks 242,244 face each other and are provided on opposite sides of a rotatable collar 246. The collar 246 has a bolt 248, or a pair of oppositely-directed bolts 248, mounted thereto, with the opposite bolt ends 250, 251 being counter-threaded i.e. with a right-hand thread on one end and a left-hand thread on the other.

A removable handle 252 may be temporarily connected to the collar 246 and rotation of the handle 252 causes rotation of the collar 246 and corresponding rotation of the bolt(s) 248 which draws together the two inserts 234,236 in order securely to bolt together the inserts 234,236 to the collar 246. After removal of the handle 252, all the remaining bolts may be correspondingly tightened to provide a secure multiple-bolt fitting between the two segments 220,222 of the wind turbine blade.

As shown in FIG. 19, the U-section molding 226,228 may be provided on an annular end, which need not be circular, of a spar 254 concealed by the outer skin 256 of a wind turbine blade. Such an implementation does not necessarily require the array of bolts to be circular; rather the bolt pattern may be arranged to suit the cross-section of the blade spar at that point.

Referring to FIG. 20, in a manner similar to the embodiments of FIGS. 14 to 17, an assembly is provided to provide that the U-section strap moulding can carry both tensile and compressive loads when attaching together two segments of a wind turbine blade. In this embodiment, as is similar to the structure of FIG. 14, the convex end 258 of the U-section moulding 260 of each respective segment 262, 264 of a wind turbine blade is received in a respective support body 266,

268 having a complementarily shaped annular concave grooved recess 270, 272. The two support bodies 266, 268, one for each wind turbine blade segment 262, 264, are separated by a rotatable collar 272 disposed therebetween and mounting a bolt 270 threadably fitted to the opposed inserts 274, 276. Rotation of the collar 272 in the manner described hereinabove with respect to the embodiment of FIG. 18, causes rotation of the bolt 270 and secure bolting together of the two wind turbine blade segments 262, 264.

Various modifications may be made to the illustrated embodiments, as summarised below.

In all of the illustrated embodiments of the present invention the insert includes a bore into which a threaded bolt or stud may be received. However, in any of the embodiments, including the illustrated embodiments, an alternative bolt/stud structure may be provided in which the bolt or stud may be attached to the insert by means other than a thread, for example the bolt or stud may be formed with a "head" captured or otherwise secured by the insert, the bolt or stud may be welded to the insert, or the bolt or stud may even be formed as part of or integral with the insert e.g. by forging.

The insert rear face may abut the end face of the support portion as shown in the illustrated embodiments, or may be spaced therefrom when the U-section spar mounting is adapted to take compressive loads, in particular for the embodiments of FIGS. 14 to 17 using the support block with the load supporting groove.

In a preferred embodiment of the invention, the metal inserts incorporate a neck that protrudes through the holes in the U-section moulding, lengthening the part of the insert securing the bolt or stud, which is optionally threaded, and giving a flat, machined face to butt up against the jig and eventually the wind turbine pitch bearing. However, such necks may be omitted in some embodiments (see FIGS. 11 to 13, for example)

A gap-filling compound or adhesive may be used between the metal inserts and the blade root and/or the U-section strap moulding. This may be the same adhesive used to bond the U-section strap moulding to the blade root.

The U-section strap moulding may be laminated in-situ over the inserts and blade root, to avoid using a separate mould and to avoid a blind adhesive bond (with potential for gaps and voiding) between the U-section strap moulding and the root.

The metal inserts may be linked together by an interlocking mechanism e.g. dog-bone shaped metal inserts, or may be formed with similar shapes integral to the main body of the insert, or the metal inserts could be made from a continuous strip such that one metal insert is drilled for a plurality or even all of the bolts.

The U-section strap moulding may be a continuous part for the entire circumference of the root or it may be made in several shorter segments. In the extreme case there may be one segment per bolt. The segments may be tapered at their ends to overlap forming a scarf joint at each intersection.

The U-section strap moulding may be made in segments that pass between the bolts or necks, hence do not need to have holes in way of the bolts or necks. This potentially reduces manufacturing time and material usage and stress concentrations at the holes.

The U-section strap moulding can be manufactured in two pieces overlapping in the curved end portion, as for the embodiment of FIG. 12.

For ease of assembly, as shown in FIG. 11 a slight flare may be added to the U-section strap moulding, with a corresponding tapering of the root outer surface, to allow a consistent adhesive bond whilst the U channel is bonded in place. The U channel can be premade on a male or female mould, and the flare described provides ease of de-moulding.

The holes in the inserts may be blind-ended or open-ended.

The blade laminate may be thickened locally by the addition of a foam wedge (see FIG. 8, for example) or by leaving a void which could be filled with a low density filler. This avoids adding extra weight if extra thickness is required to provide enough depth to match the metal inserts.

The metal inserts may be concave or incorporate grooves (see FIGS. 8 and 9, for example) to inhibit delamination of the root under compressive loading. Alternatively they may be convex at the corner between the U-channel strap moulding and the blade root to reduce stress concentrations in the fibre reinforced composite material.

For the fibre reinforced composite material of the U-section strap moulding, and for the root, the fibres may be oriented mostly in the blade's longitudinal direction, with a proportion in other directions to help spread the load.

The structure of the attachment of the various embodiments of the present invention provides a number of technical effects and advantages.

With the bolts in tension, the fibre reinforced composite material used for the U-channel moulding is loaded primarily in tension in the fibres, the most efficient method of loading for composites. With the bolts in compression, the load is carried directly in compression in the blade fibres. The resin matrix of the fibre reinforced composite material is not loaded other than in transferring the load from the U-channel to the root by interlaminar shear, which can be kept within reasonable limits by gradually tapering the thickness of the legs of the U-channel moulding towards their respective tips, as illustrated in the figures. Thus the composite material is used more efficiently than in the known T-bolt system, so the laminates can be thinner.

Unlike the known T-bolt system (a), the metal inserts are not constrained to be cylindrical hence can be made with less material.

The metal inserts are much shorter than the laminated-in bushes in existing system (c), and hence lighter.

The bolts can be shorter, hence lighter, than those used in any existing system described above.

In the described embodiments of the invention in which the metal inserts include a neck that protrudes out through the hole in the U-section strap moulding, bolt pretension (which may be several times the typical bolt working load) is carried by direct abutment between the insert and the pitch bearing, thus relieving that load from the composite part of the blade root assembly. This is in contrast to the known T-bolt system in which the bolt pre-tension is taken by abutment between the composite root and the pitch bearing.

Compared to the laminated-in bushes system (c), the lamination of the blade root is simpler.

The bond area between the U-section strap moulding and the root is greater than the bond area between the bushes and the laminate in the bush systems (b) and (c), hence the root part of the blade can be shorter (i.e. lighter) and the bond stress lower (i.e. more reliable).

Compared to the T-bolt system (a) and the bonded-in bushes system (b), the basic root laminate (1) can be considerably thinner. This reduces the weight and cost of material but more importantly reduces the likelihood of exothermic reaction during cure, which allows the root to be cured more quickly, hence decreasing manufacturing cycle time. It also reduces or eliminates the need for a separate root moulding.

Compared to the T-bolt system (a) which requires 2 holes to be drilled per bolt and the bonded-in bushes system (b) which requires one very long hole to be drilled per bolt into the blade root, the drilling requirements of the invention are simpler. This is because the holes are drilled in the U-section strap moulding which is much smaller hence easier to manipulate accurately than the blade root. The tolerance of the holes is also less critical since they can be over-sized around the bolts; the exact bolt positions are determined by the jig.

As compared to known systems for attaching a wind turbine blade root to a pitch bearing of a hub, the preferred embodiments of the present invention can improve on the previous systems by one or more of the following; being lighter; reducing machining of the finished blade or spar; offering increased bond area and/or reduced root length; offering reduced bolt length; carrying bolt preload directly in the metalwork; offering reduced laminate thickness hence easier/faster manufacture without exothermic reaction; potential cost savings in materials; and/or potential increase of productivity by a high part turnaround.

The invention claimed is:

1. A wind or tidal turbine blade having an attachment, the attachment comprising:
    a support portion of the turbine blade, the support portion having opposite surfaces and an end face;
    an insert adapted to mount a bolt for attaching the support portion to another structure, the insert having a rear face that abuts the end face of the support portion; and
    a mounting for fitting the insert to the support portion, the mounting comprising a strap molding of a fibre reinforced composite material, the strap molding extending over and dimensioned to fit against a front face of the insert and the strap molding is fitted and bonded to the opposite surfaces of the support portion on opposite sides of the insert so that the strap molding is in contact with the opposite surfaces of the support portion and the front face of the insert, the strap molding permitting passage of a bolt therethrough to or from the insert.

2. A turbine blade according to claim 1 wherein the insert includes a neck extending outwardly from the front face, the bolt extending from the neck.

3. A turbine blade according to claim 1 wherein the support portion is annular and the attachment provides at least one insert and at least one mounting forming an annular assembly for attaching the annular support portion to the another structure by a plurality of bolts, each bolt extending from the at least one insert.

4. A turbine blade according to claim 3 wherein the at least one insert comprises a plurality of inserts, each having a respective bolt, the inserts being arranged annularly around the support portion.

5. A turbine blade according to claim 4 wherein adjacent side surfaces of the adjacent inserts abut.

6. A turbine blade according to claim 3 wherein the at least one insert comprises a single annular insert.

7. A turbine blade according to claim 3 wherein the at least one mounting comprises a single annular mounting.

8. A turbine blade according to claim 1 wherein the mounting has a central portion covering the insert and opposed legs bonded to the opposite surfaces of the support portion on the opposite sides of the insert.

9. A turbine blade according to claim 8 wherein the mounting has a U-shaped section.

10. A turbine blade according to claim 8 wherein the opposed legs each have an end part of tapered cross-section, the leg thickness decreasing towards a free end of the respective leg.

11. A turbine blade according to claim 8 wherein the mounting is preformed.

12. A turbine blade according to claim 1 wherein the support portion is a root of a wind or tidal turbine blade.

13. A turbine blade according to claim 1 wherein the support portion is an end portion of a segment of a wind or tidal turbine blade.

14. A turbine blade according to claim 1 wherein the insert includes a bore for receiving a respective bolt.

15. A turbine blade according to claim 14 wherein the bolt is threadably received in the bore.

16. A turbine blade according to claim 4 wherein the bolt is captured in the insert.

17. A turbine blade according to claim 1 wherein the mounting includes a hole for passage therethrough of a respective bolt extending from the insert.

18. A turbine blade according to claim 1 wherein the support portion comprises a fibre reinforced composite material, including a central core.

19. A turbine blade according to claim 1 wherein the strap molding comprises a laminate material that is a mixture of triaxially-oriented and unidirectional fibre-reinforced composite materials or a mixture of biaxially-oriented and unidirectional fibre-reinforced composite materials.

* * * * *